E. E. HANNAH.
SAFETY CLUTCH DEVICE.
APPLICATION FILED NOV. 25, 1913.

1,153,782.  Patented Sept. 14, 1915.

Witnesses

Inventor
E. E. Hannah
By Victor J. Evans
Attorney

UNITED STATES PATENT OFFICE.

ELMER ELLSWORTH HANNAH, OF ESTACADA, OREGON.

SAFETY CLUTCH DEVICE.

1,153,732.  Specification of Letters Patent.  Patented Sept. 14, 1915.

Application filed November 25, 1913. Serial No. 803,052.

*To all whom it may concern:*

Be it known that I, ELMER ELLSWORTH HANNAH, a citizen of the United States, residing at Estacada, in the county of Clackamas and State of Oregon, have invented a new and useful Safety Clutch Device, of which the following is a specification.

The invention relates to a clutch, and more particularly to the class of safety clutch devices for shafts or the like.

The primary object of the invention is the provision of a clutch of this character wherein two shafts or the like can be united so that the same will be driven simultaneously in one direction, the uniting of the shafts or the like being effected irrespective of the rotation thereof or when one shaft is rotating in one direction while the other shaft is rotating in the reverse direction.

Another object of the invention is the provision of a clutch of this character wherein the shock resulting from the joining of the adjacent ends of shafts will be overcome, that is to say absorbed in a novel manner to avoid undue strain on either of said shafts during the act of coupling.

A further object of the invention is the provision of a clutch of this character wherein the ends adjacent to each other of shafts or the like will be positively locked together when it is desired to join the same whereby motion from one of the shafts or the like will be imparted to the other, the shafts being readily uncoupled when the occasion requires.

A still further object of the invention is the provision of a clutch of this character which is extremely simple in construction, thoroughly reliable and efficient in its operation, strong, durable and inexpensive in manufacture.

With these and other objects in view, the invention consists in the construction, combination and arrangement of parts as will be hereinafter fully described, illustrated in the accompanying drawings, and pointed out in the claims hereunto appended.

Figure 1:
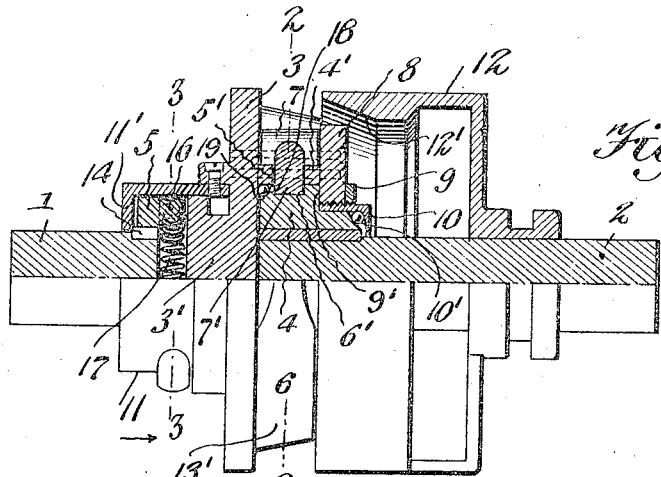
Figure 2:
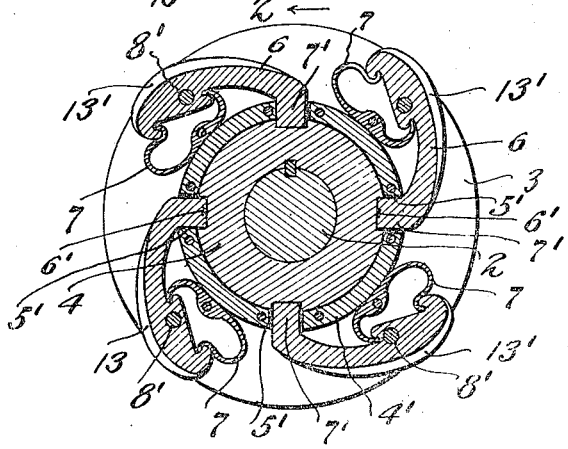
Figure 3:
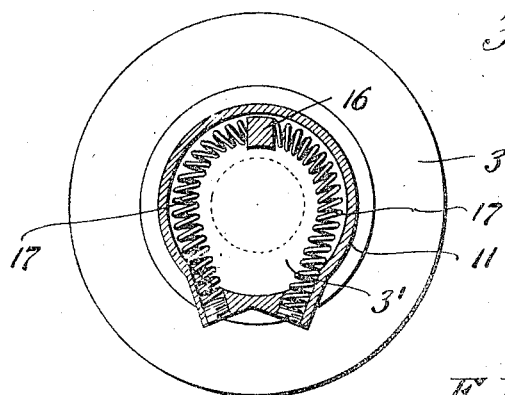

In the drawing, Figure 1 is an elevation, showing the ends adjacent to each other of two shafts with a coupling constructed in accordance with the invention applied, the said shafts and coupling being partly in section; Fig. 2 is a sectional view on the line 2—2 of Fig. 1; and Fig. 3 is a sectional view on the line 3—3 of Fig. 1.

Similar reference characters indicate corresponding parts throughout the several views in the drawing.

Referring to the drawing in detail, the numerals 1 and 2 designate respectively the ends adjacent to each other of two shafts, with which is associated a coupling device hereinafter fully described.

The coupling device comprises a disk-like member 3 which is interposed between the shafts 1 and 2, and has formed centrally thereon a boss 3' which projects from one face thereof, while spaced from the said boss 3' is a collar 5, the same being suitably keyed or splined at 14 to the shaft 1 which it encircles so that the collar is fixed thereto.

Formed on the collar 5 at the inner face thereof is a lug 16 which is disposed near its periphery, while between the said collar 5 and the boss 3' are arranged compression springs 17 which are disposed concentrically with respect to the shaft 1 and act as shock absorbers to overcome any undue strain or shock to either of the shafts 1 or 2 on the coupling of the same together in a manner presently described.

Surrounding the boss 3' and collar 5 to form a housing for the springs 17 is a cylindrical cap 11 which is suitably detachably secured to the disk-like member 3, and is provided with an inturned annular flange 11' which overlaps the outer face of the collar 5 to prevent the separation of the disk-like member from the shaft 1, yet both the latter and the disk-like member can rotate to a slight degree independently of each other. The springs 17 are detachably held within the cap 11, for example, as shown in the drawing.

On the shaft 2 is splined or keyed a sleeve 4 which is loosely fitted within a ring or annulus 4' fixed to or integral with the disk-like member 3, the said ring or annulus being formed with a series of openings 5' disposed at diametrically opposite points with respect to each other, while formed in the sleeve 4 are notches 6', the latter being adapted to register with the openings 5' through which work the hook-like ends 7' of swinging locking dogs 6 which are supported upon pivots 8' mounted in the disk-like member 3, and a keeper ring 8 which is spaced from the said member 3 by the ring or annulus 4, the said keeper ring 8 and the ring or annulus 4' being fastened to the latter in any suitable manner. The sleeve 4 is reduced at one end to form a channel 9' for receiving the keeper ring 8 so that the said sleeve 4 will be prevented from pulling out of the ring or annulus 4', yet the said sleeve 4 is free for rotation therein when the locking ends 7' of the dogs 6 are disengaged from the notches 6' in the said sleeve for the rotation of the shafts 1 and 2 independently of each other. Detachably threaded in the ring 8 is a ball cone 10 in which are arranged a series of bearing balls 10', the latter working against the reduced end of the sleeve 4, and this cone loosely surrounds the shaft 2, thus it being seen that the bearing balls 10' minimize friction during the rotation of the shafts independently of each other.

Formed in the sleeve 4 is a ball raceway 18 in which are arranged a series of bearing balls 19 which travel upon the ring or annulus 4' so as to reduce friction between the sleeve 4 and the said ring or annulus during the rotation of the shafts independently of each other.

Mounted on the member 3 and working against the dogs 6 are springs 7 which have their ends suitably engaged in the respective dogs and serve to sustain the dogs in position for positive locking engagement with the sleeve 4, yet the said dogs 6 can be disengaged therefrom in a manner presently described.

Loosely surrounding the shaft 2 is a substantially cup-shaped wheel 12 formed with an integral internal cam surface 12', the latter adapted for engagement with inclined friction surfaces 13' formed on the dogs 6 when the wheel 12 is moved longitudinally on the shaft 2 in a direction toward the disklike member 3, and in this manner the dogs 6 are moved to releasing position for disengagement from the notches 6' in the sleeve 4 to unlock the shafts 1 and 2 from each other, the wheel 12 being shifted longitudinally toward and away from the disk-like member 3 in any suitable manner.

In the operation of the coupling, assuming that normally the shafts 1 and 2 are unlocked from each other, this being accomplished by moving the wheel 12 in a direction to bring the cam 12' into contact with the surfaces 13' on the dogs 6, thus disengaging the said dogs from the sleeve 4 so that the shaft 2 is free for rotation independently of the shaft 1. Now, to lock the shafts together the wheel 12 is moved away from the member 3 so that the cam 12' rides from the surfaces 13' on the dogs 6, and at this instant the spring 7 becomes active to bring the dogs into locking engagement in the notches 6' in the sleeve 4 so that in this manner the shafts 1 and 2 will be locked together. When the shafts have been locked in this manner, should one shaft be rotated and the other passive, the shock incident to the coupling of the two shafts will be absorbed through the medium of the two springs 17, which permits the disk 3 to rotate a limited distance under tension relative to the shaft 1, as will be clearly apparent.

From the foregoing description, taken in connection with the accompanying drawing, it is thought that the construction and manner of use of the device will be clearly understood, and therefore a more extended explanation has been omitted.

What is claimed is:

1. The combination with a pair of rotatable elements, of a member arranged between the elements and loosely connected therewith, a collar fixed to one of said elements, compression springs coöperative with the member and the said collar for tensioning the same relative to each other, a sleeve fixed to the other element, a spring held dog carried by the said member for locking engagement with the sleeve, and means carried by the said other element for engagement with the dog to release the same from the sleeve.

2. The combination with a pair of rotatable elements, of a member arranged between the elements and loosely connected therewith, a collar fixed to one of said elements, compression springs coöperative with the member and the said collar for tensioning the same relative to each other, a sleeve fixed to the other element, a spring held dog carried by the said member for locking engagement with the sleeve, means carried by the said other element for engagement with the dog to release the same from the sleeve, and means for preventing the displacement of the member relative to one of said elements.

3. The combination with a pair of rotatable elements, of a member arranged between the elements and loosely connected therewith, a collar fixed to one of said elements, compression springs coöperative with the member and the said collar for tensioning the same relative to each other, a sleeve fixed to the other element, a spring held dog carried by the said member for locking engagement with the sleeve, means carried by the said other element for engagement with the dog to release the same from the sleeve, means for preventing the displacement of the member relative to one of said elements, and means for preventing displacement of the said member relative to the said sleeve.

ELMER ELLSWORTH HANNAH.

Signed in the presence of—
  A. E. SPARKS,
  J. NICHOLSON.